(12) United States Patent
Kurihara et al.

(10) Patent No.: US 8,627,809 B2
(45) Date of Patent: Jan. 14, 2014

(54) ENGINE LUBRICATION METHOD

(75) Inventors: Katsumi Kurihara, Aichi (JP); Shigeo Yamamoto, Hiroshima (JP)

(73) Assignee: ETG Limited, Central (HK)

( * ) Notice: Subject to any disclaimer, the term of this patent is extended or adjusted under 35 U.S.C. 154(b) by 0 days.

(21) Appl. No.: 13/465,110

(22) Filed: May 7, 2012

(65) Prior Publication Data

US 2013/0074802 A1    Mar. 28, 2013

Related U.S. Application Data

(63) Continuation-in-part of application No. 13/239,803, filed on Sep. 22, 2011.

(51) Int. Cl.
*F02B 25/06*     (2006.01)
*F01M 3/04*      (2006.01)
*F01M 13/00*     (2006.01)

(52) U.S. Cl.
USPC ........ 123/572; 123/41.86; 123/573; 123/574; 123/196 M

(58) Field of Classification Search
USPC .............................. 123/41.86, 572, 573, 574
See application file for complete search history.

(56) References Cited

U.S. PATENT DOCUMENTS

| | | | |
|---|---|---|---|
| 4,404,936 A | 9/1983 | Tatebe et al. | |
| 6,202,613 B1 * | 3/2001 | Nagai | 123/90.34 |
| 6,213,079 B1 * | 4/2001 | Watanabe | 123/196 R |
| 7,287,508 B2 | 10/2007 | Kurihara | |
| 7,624,714 B2 * | 12/2009 | Kurihara et al. | 123/196 M |
| 8,171,923 B2 * | 5/2012 | Shudo et al. | 123/572 |
| 2011/0067669 A1 | 3/2011 | Sugiyama et al. | |

* cited by examiner

*Primary Examiner* — Thanh Truong
*Assistant Examiner* — Tea Holbrook
(74) *Attorney, Agent, or Firm* — IPUSA, PLLC

(57) ABSTRACT

An engine lubrication method is provided. The four-cycle engine has an engine block having a cylindrical bore and an enclosed oil reservoir. A crankshaft is mounted in the engine block. An oil pump driven by the cam gear, brings the oil from the oil reservoir and the valve chamber. The engine is provided with a cylinder head assembly having a pair of overhead intake and exhaust valves. A circular arc wall surrounds the web of the crankshaft at a slight distance from the web. The crankshaft web causes the oil to fly to lubricate engine parts and the oil, returns into the oil reservoir by a check valve. Flowing of oil in to the combustion chamber when the engine is oriented to incline is prevented by oil recesses and long pipes. Another lubrication and breathing system without pump is presented, wherein construction except pump is basically followed.

6 Claims, 15 Drawing Sheets

SECTION II-II

SECTION VI-VI

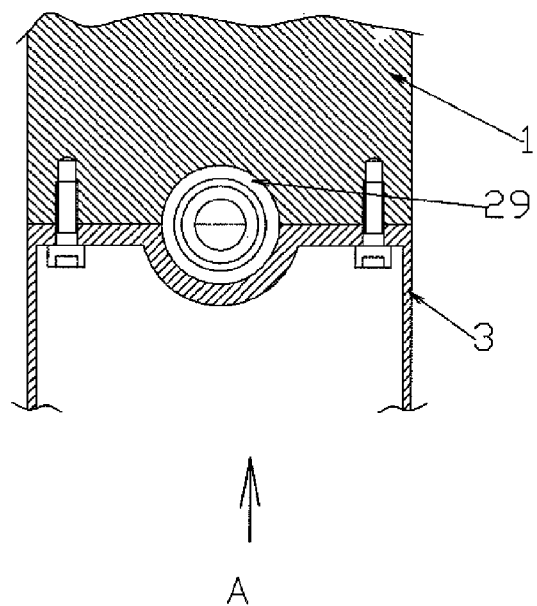
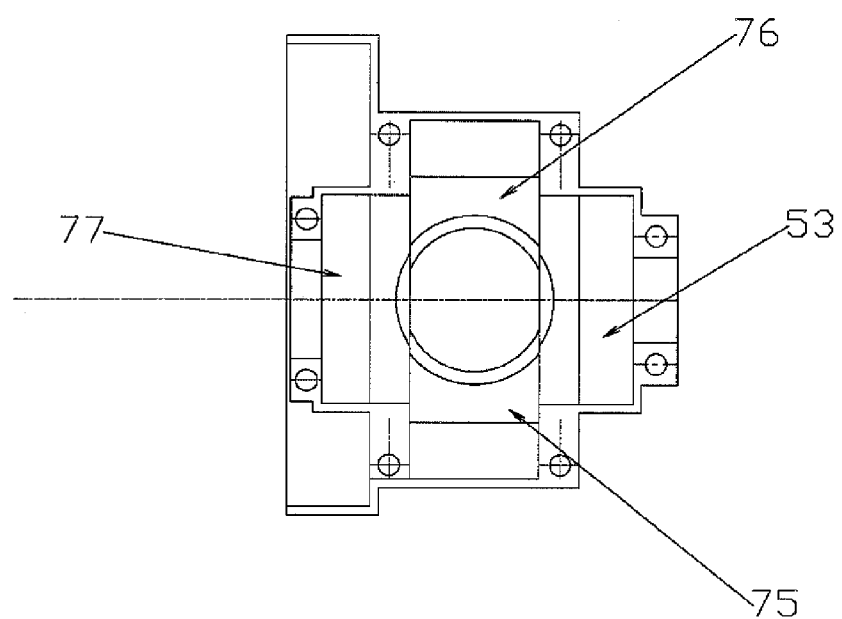

SECTION II-II

SECTION I-I

SECTION I-I

SECTION II-II

ENGINE LUBRICATION METHOD

CROSS REFERENCE TO RELATED APPLICATION

This is a continuation-in-part application of U.S. patent application Ser. No. 13/239,803 filed on Sep. 22, 2011, the entire contents of which are incorporated herein by reference.

BACKGROUND OF THE INVENTION

1. Field of the Invention

This invention relates to an engine, and more particularly, an engine construction and a lubrication method for a small four-cycle internal combustion engine which is particularly suitable for the use with portable or transportable power tools.

2. Description of the Related Art

U.S. Pat. No. 7,287,508 to Kurihara and U.S. Pat. No. 7,624,714 to Kurihara et al., which are incorporated herein by reference, disclose a light weight and compact prior art small four-cycle engine construction.

Portable power tools such as line trimmers, blower/vacuums, chain saws are mostly powered by two-cycle internal combustion engines or electric motors. Some transportable power tools such as tiller/cultivators, generators are currently powered by two-cycle or four-cycle internal combustion engines. With the growing concern regarding air pollution, there is increasing pressure to reduce the emissions of both portable and transportable power equipment. Electric motors unfortunately have limited applications due to power availability for corded products, and battery life and power availability for cordless devices. In instances where weight is not an overriding factor such as lawn mowers, emissions can be dramatically reduced by utilizing heavier four-cycle engines. When it comes to power tools such as line trimmers, chain saws and blower/vacuums, however, four-cycle engines pose a very difficult problem. Four-cycle engines tend to be too heavy for a given horsepower output and lubrication becomes a very serious problem since portable or transportable power tools must be able to run in a very wide range of orientations except for generators or tiller/cultivators. For some tiller/cultivators powered by four-cycle engines with vertical power shafts, lubrication also becomes a serious problem since it is difficult to use the same lubrication system as engines with horizontal power shafts.

Therefore, it is an object of the present invention to provide a small four-cycle internal combustion engine having low emissions that is sufficiently light in weight to be carried and/or transported by an operator, which is especially suitable for a hand-held or transportable power tool.

It is a further object of the present invention to provide a small four-cycle internal combustion engine having an internal lubrication system enabling the engine to be run at a wide variety of orientations typically encountered during normal operation, which is especially suitable for a portable or transportable power tool.

It is a further object of the present invention to provide a small lightweight four-cycle engine having an engine block, an overhead valve train and a lubrication system to deliver oil to lubricate the crankshaft chamber throughout the normal range of operating positions, which is especially suitable for a portable or transportable power tool.

It is a further object of the present invention to provide a lubricant return system to return lubrication oil into oil reservoir after lubricating parts in the crankshaft chamber and the overhead valve chamber.

In the previously-discussed prior art applications, circular and scroll-type walls play an important role in the inventions. However, the construction to make these walls is not so cost effective and not so compact. Thus, it is a further object of the present invention to provide a more cost effective and more compact construction.

A breather system is also an important issue within engines. U.S. Pat. No. 4,404,936 to Tatebe et al. discloses a typical breather system for a non-portable utility engine, wherein, by pressure change in the crankshaft chamber due to reciprocating motion of a piston, the breathing gas is sent via a check valve to an air cleaner through a breather pipe, and then inhaled into a combustion chamber. The check valve opens and allows a gas flow from the crankshaft chamber to the breather pipe when the pressure in the crankshaft chamber is higher than that in the breather pipe, and closes and does not allow a gas flow from the crankshaft chamber to the breather pipe when the pressure in the crankshaft chamber is lower than that in the breather pipe. Since the pressure in the breather pipe is almost equal to the atmospheric pressure, a pressure in the crankshaft chamber is kept in a little lower than the atmosphere, so that the function of piston rings is kept normal and undesirable leakage of gas from the combustion chamber to the crankshaft chamber is prevented and, in a stable running condition of the engine, the gas flow in the breather pipe is substantially only a blow-by gas from the combustion chamber.

However, in an engine for a portable or transportable power tool, especially in an engine which lubricant is carried and circulated by the gas flow made by the pressure change in the crankshaft chamber, the circulating gas includes not only the blow by gas but also a fresh air taken from the outside of the engine. For instance, in U.S. Patent application 2011/0067669A1, a breathing gas is inhaled from a valve chamber to an air cleaner and then oil is separated in the air cleaner and sent to a crankshaft chamber through a check valve by reciprocating motion of a piston. At that time, the oil, separated from the breathing gas and sent to the crankshaft chamber, brings fresh air from the air cleaner. Further, since a passage from the air cleaner to the crankshaft chamber is joined with a suction passage of oil from an oil reservoir to the crankshaft chamber, in every reciprocating stroke of the piston, some quantity of fresh air inhaled from the outside of the engine through the air cleaner mixes with the oil suctioned from the oil reservoir and enters into the crankshaft chamber. As a result, suction of liquid oil from the oil reservoir is obstructed by inhalation of fresh air so that gas pressure in the crankshaft chamber is higher than the previously mentioned non-portable engine (for instance, U.S. Pat. No. 4,404,936 to Tatebe) and in some cases, it is more than the atmospheric pressure in the down stroke of the piston. This higher pressure produced in the crankshaft chamber helps to circulate lubricant carried by gaseous mixture, but spoils function of piston rings. Therefore the mechanism described above increases blow by gas from the combustion chamber and increases oil consumption. Further, increase of circulating gas brings an increase of a pumping loss.

Therefore, it is a further object of the present invention to provide a lubrication and breather system which minimizes an increase of a pumping loss due to the increase of the circulating gas.

These objects, features and advantages, and other objects, features, and advantages of the present invention will become apparent upon further review of the remainder of the specification and the accompanying drawings.

SUMMARY OF THE INVENTION

In order to achieve the above objects, a four-cycle, internal combustion engine is provided which is suitable for use with portable or transportable power tools. The four-cycle engine is provided with an engine block having at least one cylindrical bore oriented in a normally upright orientation having an enclosed combustion chamber.

A lower case is attached to the said cylinder block with a horizontal mating plane. The cylinder block and said lower case form a crankshaft chamber. A crankshaft is pivotably mounted within the crankshaft chamber. An enclosed oil reservoir is located below the crankshaft chamber separated from the crankshaft chamber by a substantially circular wall.

A pump is connected drivably to a cam gear-cam assembly, and said pump brings lubrication oil from the oil reservoir to deliver oil into the cylinder.

When lubrication oil is properly filled, the engine is able to rotate or to be stored without oil flowing into combustion chamber at any inclination posture.

As an another embodiment of the present invention, a lubrication and breathing system without pump is provided, wherein construction without the pump is basically followed.

BRIEF DESCRIPTION OF THE DRAWINGS

FIG. 7 is a section view of the cylinder block and the lower case taken along line III-III in FIG. 1;

FIG. 8 is an elevation view of the cylinder block viewing from A in FIG. 7;

DESCRIPTION OF THE EMBODIMENTS

Figure 1:
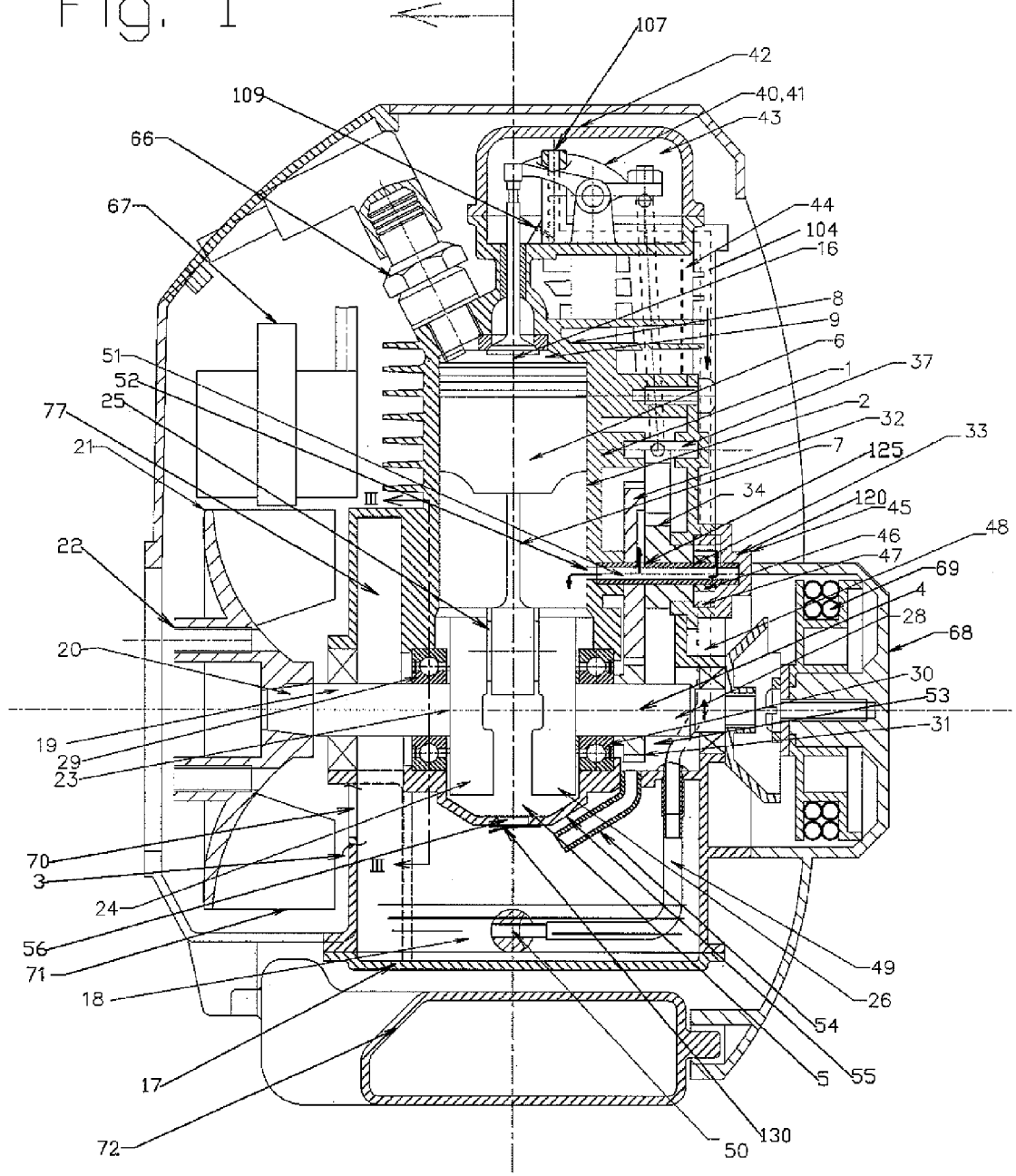
FIG. 1 is a cross-sectional side elevation view of the engine taken along the rotating axis of the crankshaft and axis of cylinder bore taken along line I-I in FIG. 2.
Figure 2:
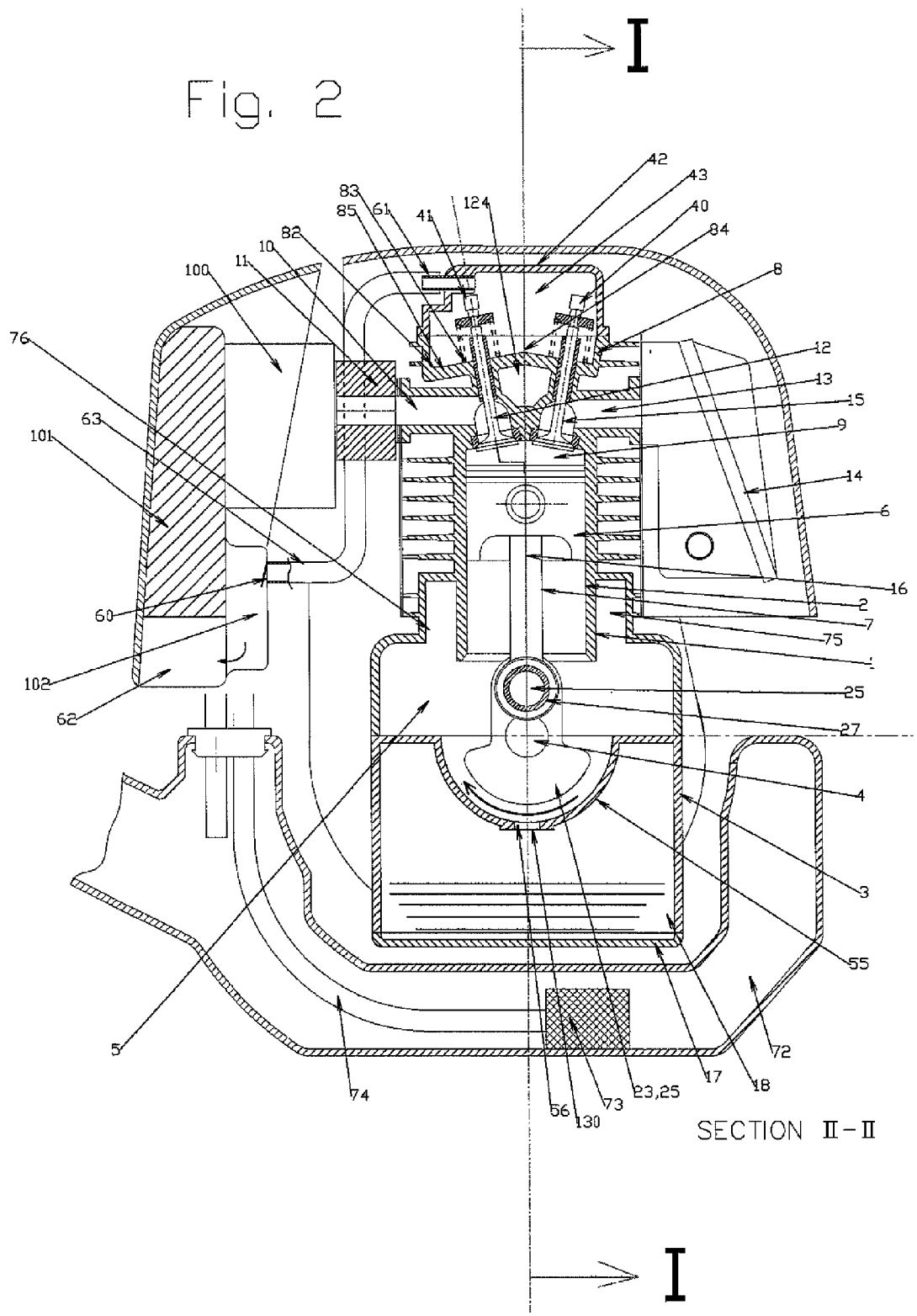
FIG. 2 is a cross-sectional side elevation view of the engine taken along line II-II in FIG. 1.

FIG. 1 and FIG. 2 are cross-sectional side elevation views of a four-cycle engine. The four-cycle engine is made up of a lightweight aluminum housing including a cylinder block 1 having a cylindrical bore 2 formed therein.

A lower case 3 and said cylinder block 1 mate with each other at the horizontal interface and form a crankshaft chamber 5.

A crankshaft 4 is pivotably mounted within the crankshaft chamber 5 in a conventional manner. The axis of said crankshaft 4 is contained at the horizontal interface to mate cylinder block 1 and lower case 3.

A piston 6 slides within the cylindrical bore 2 and is connected to the crankshaft 4 by a connecting rod 7. A cylinder head 8 is integrated into the engine block 1 to define an enclosed combustion chamber 9.

The cylinder head 8 is provided with an intake port 10 coupled to an insulator 11 and a carburetor 100 and selectively connected to the combustion chamber 9 by an intake valve 12. A filter element of air cleaner 101 eliminates dust brought from the intake air into the engine. The cylinder head 8 is also provided with an exhaust port 13 connected to a muffler 14 and selectively connected to the combustion chamber 9 by an exhaust valve 15.

As illustrated in FIGS. 1 and 2, the cylinder axis 16 of four-cycle engine is generally upright in normal use.

The lower case 3 is connected to a bottom cover 17 that provides an enclosed oil reservoir 18.

The crankshaft 4 is provided with an axial shaft member 19 having an output end 20 adapted to be coupled to a flywheel 21 which has an implement input member 22. An input end 23 of axial shaft member 19 is coupled to a counterweight web 24. A crankpin 25 is affixed to counterweight webs 24, 26 and is parallel to and radially offset from the axial shaft 19. The crankpin 25 pivotally cooperates with a roller bearing 27 (FIG. 2) mounted in the connecting rod 7.

The axial shafts 19 and 28 of crankshaft 4 are pivotably attached between the cylinder block 1 and the lower case 3 by a pair of one-side sealed bearings 29 and 30. At one side of bearing 30, a crank gear 31 is mounted on the crankshaft 4 in a cam chamber 53.

Figure 3:
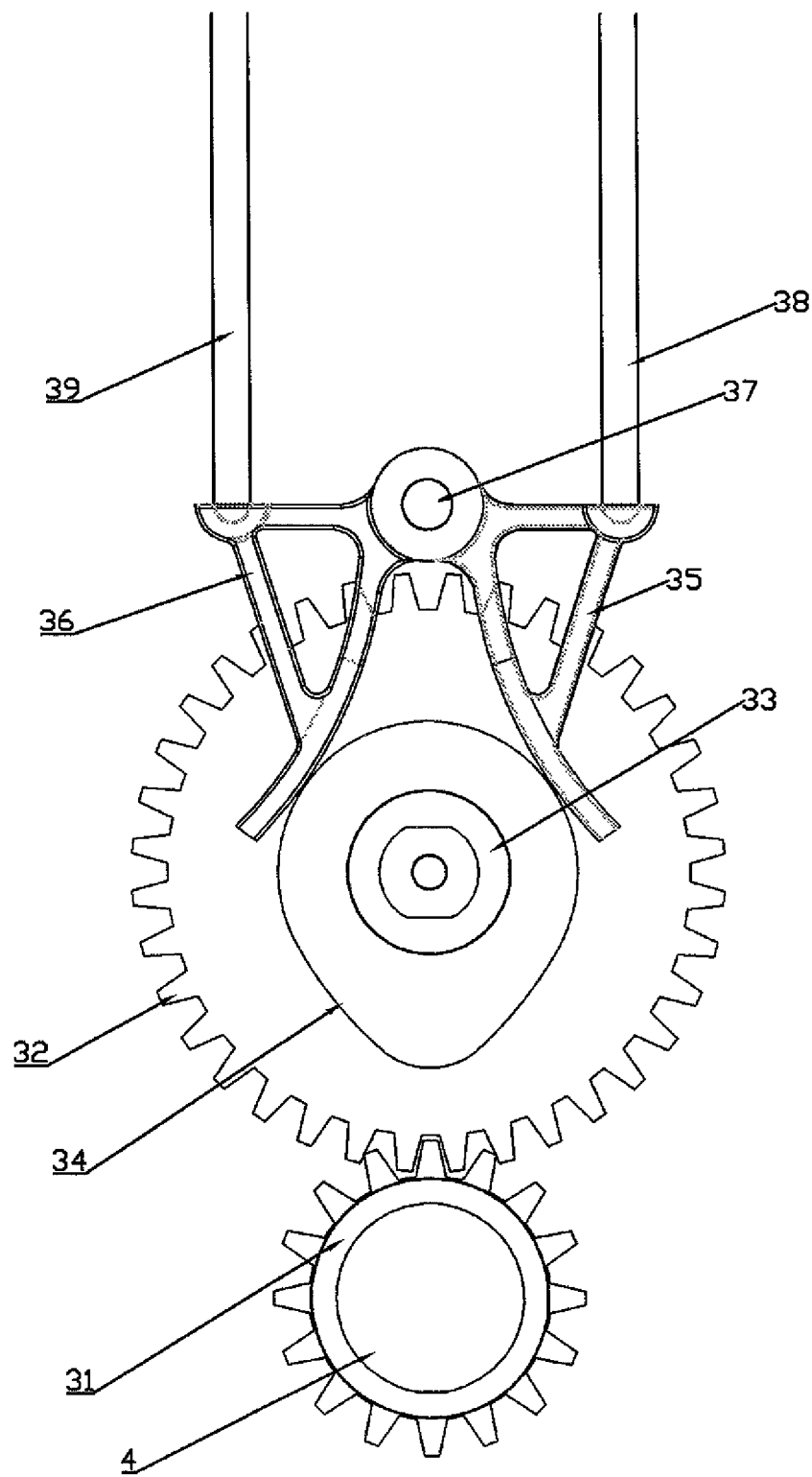
FIG. 3 is an enlarged schematic illustration of the camshaft and the follower mechanism.

A camshaft drive and valve lifter mechanism is best illustrated in FIGS. 1 and 3. The crank gear 31 mounted on the crankshaft 4 in turn drives a cam gear 32 with twice the number of teeth as the crank gear 31, resulting in the camshaft 33 rotating in one-half engine speed. The cam gear 32 is affixed to a camshaft 33 which is journaled to the cylinder block 1 and includes a rotary cam lobe 34. In the embodiment illustrated, a single cam lobe is utilized for driving both the intake and exhaust valves. Followers 35 and 36 are pivotably connected to the cylinder block 1 by a pivot pin 37.

Push rods 38 and 39 extend between camshaft followers 35 and 36 and rocker arms 40 and 41 located within the cylinder head 8. The cam 34, push rods 38, 39 and rocker arms 40, 41 are part of a valve train assembly. Affixed to the cylinder head 8 is a valve cover 42 which defines therebetween an enclosed valve chamber 43.

A wall 44 surrounds the intake and exhaust push rods 38 and 39 in a conventional manner in order to prevent the entry of dirt into the engine.

The cam chamber 53 and the valve chamber 43 are in communication with each other.

Figure 6:
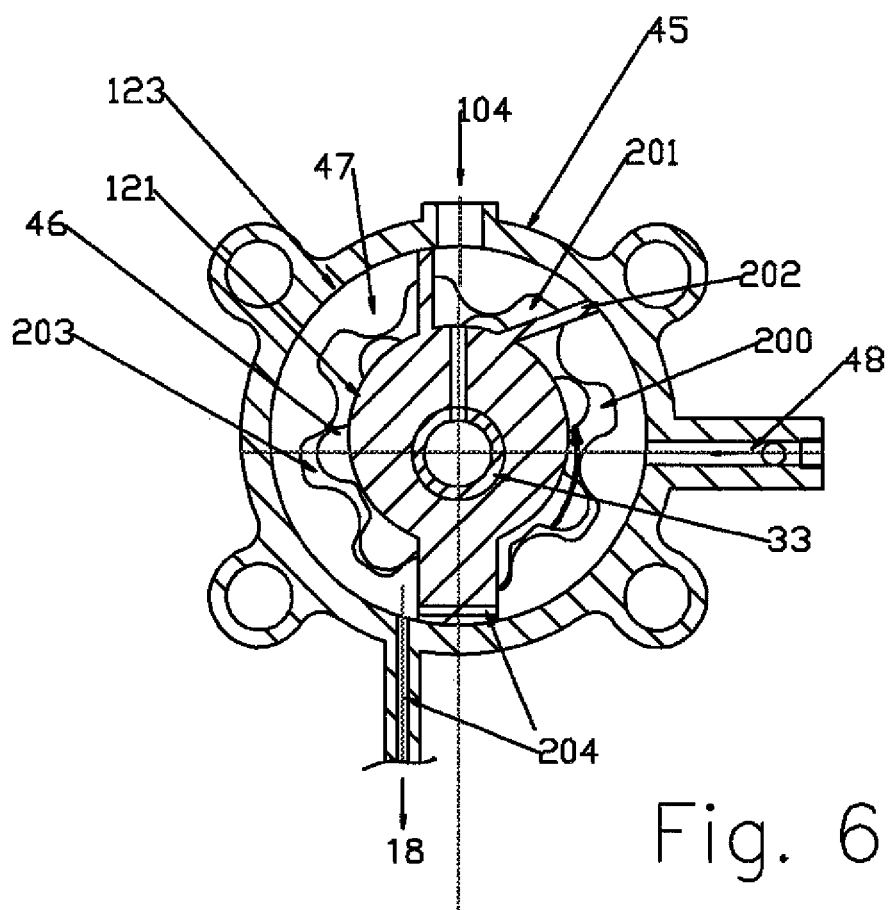
FIG. 6 is a section view of the oil pump cover that shows the detail construction of inlet and outlet cavities of the pump taken along line VI-VI in FIG. 11.
Figure 11:
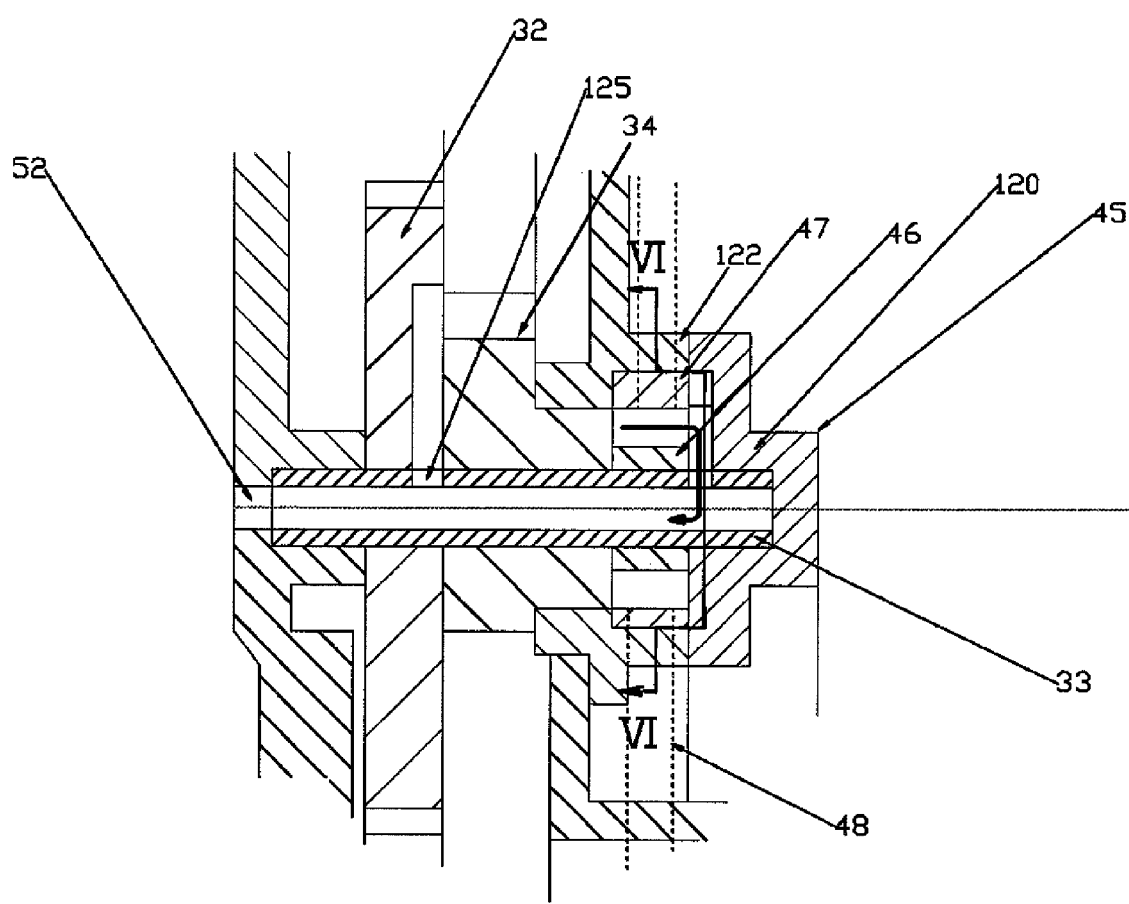
FIG. 11 is an enlarged view of the pump shown in FIG. 1.

In order to lubricate the engine, a pump 45 such as a trochoid pump is placed at the side of cam gear 32. As illustrated in FIG. 1, FIG. 6 and FIG. 11, the pump 45 is formed of a stationary pump cover 120 comprising an inner portion 121 mounted on the camshaft 33 and a stationary pump body 122 comprising an annular outer portion 123 coaxially disposed around the inner portion 121 with a certain distance from the inner portion 121, an inner rotor 46 formed on the outer surface of the camshaft 33 and an outer rotor 47 formed on the inner surface of the outer portion of the pump body. In other embodiments of the present application, a gear pump or a plunger pump may be used.

The inner rotor 46 formed on the outer surface of the camshaft 33 is driven by the cam gear 32, and the outer rotor 47 formed on the inner surface of the outer portion 123 is rotated following the rotation of the inner rotor 46. Lubrication oil flows from the passage 48. One end of the passage 48 leads to an oil entrance of the pump. The other end of passage 48 is connected to one end of a flexible tube 49. The other end of flexible tube 49 is connected to a filter to which a weight is attached (hereinafter, referred to as a weight 50). By means of the weight 50, an entrance of the flexible tube 49 is dipped in the oil in the oil reservoir 18 at any orientation of the engine.

The oil pushed out by the pump 45 is lead in parallel to a hole 52 formed in the cylinder wall and a hole 125 formed in the outer wall of the cam shaft 33 through an inner through hole 51 of the cam shaft as illustrated in FIG. 1 and FIG. 11. Accordingly, the engine parts inside the crankshaft chamber 5 and the cam chamber 53 are mist lubricated by the oil splashed by means of the rotation of and/or the centrifugal force generated by the rotating parts such as a web 24, 26.

As illustrated in FIGS. 1 and 2, a circular arc wall 55 surrounding the counterweight webs 24, 26 of the crankshaft 4 separates the crankshaft chamber 5 from the oil reservoir 18. The arc wall 55 is substantially co-axial with the axis of the counterweight web 24 or 26 and is located with a certain distance from the webs 24 and 26.

At the bottom of circular arc wall 55, a hole 56 is provided as shown in FIG. 1 and, at the bottom of the hole 56, a one way check valve 130 is provided between the crankshaft chamber 5 and the oil reservoir 18 as illustrated in FIG. 1. The check valve 130 is provided so as to open when the pressure in the crankshaft chamber 5 is higher than the pressure in the oil reservoir 18 and to close when the pressure in the crankshaft chamber 5 is lower than the pressure in the oil reservoir 18.

As illustrated in FIGS. 1 and 6, at the side of the cylinder block 1, a drilled oil passage 104 is provided. One end of the passage 104 leads to the oil entrance of the pump together with the passage 48. The other end of passage 104 leads to an upper portion in the valve chamber 43.

A small hole 109 is opened from the valve chamber to the passage 104 near the bottom surface of the valve chamber.

In other embodiments of the present application, a flexible tube may be used to provide the passage 104. An oil inlet 107 is provided at said other end of the passage 104.

As best illustrated in FIG. 6 and FIG. 11, the pump 45 has a first inlet cavity 200 which leads oil from the oil reservoir 18 through the passage 48 and a second inlet cavity 201 which leads oil from the valve chamber 43 through the passage 104.

Between the first inlet cavity 200 and the second inlet cavity 201, a wall 202 is provided to separate the cavities 200 and 201. An outlet cavity 203 provides a passage for oil to the cylinder bore through the inner hole 51. A relief oil passage 204 is formed in the outer portion 123 of the pump body 122. One end of the relief oil passage 204 opens to the outlet cavity 203. The other end of the relief oil passage 204 opens to the oil reservoir 18 through a drilled hole (not shown) or to the inlet cavity through a slit (not shown).

In the valve chamber 43, a breather pipe 61 is opened through the valve cover 42. One end of the breather pipe 61 is connected to an air cleaner case 62 through a breather tube 63.

As shown in FIG. 2, a check valve 60 is provided at the end of the breather pipe 63. The check valve 60 opens when the pressure in the breather pipe 63 is higher than the pressure in air cleaner case 62 and closes when the pressure in the breather pipe 63 is lower than the pressure in the air cleaner case 62.

The breathing oil mist provided through the breather tube 63 flows into the carburetor 100 through the filter element 101.

As illustrated in FIG. 2, around the outside wall of cylinder bore in the crankshaft chamber 5, oil recess 75 and 76 are provided.

FIG. 7 is a section view of the cylinder block 1 and lower case 3 at the portion where the bearing 29 or 30 is supported. FIG. 8 is an elevation view of the cylinder block 1 seen from A illustrated in FIG. 7.

As illustrated in FIG. 1, another oil recess 77 is provided at the outside of the bearing 29. The oil recess 77 and the oil reservoir 18 communicate each other as illustrated in FIG. 1.

As illustrated in FIG. 1, at the bottom of the cam chamber 53, a passage 54 is provided. One end of the passage 54 opens to the cam chamber 53 and the other end of the passage 54 opens near the hole 56 to the oil reservoir 18 with a distance from the oil level when the engine is in normal use.

Intake and exhaust valves 12, 15 are inclined to each other. Cooling performance of the engine in accordance with the present invention is better than that of the prior art because a cooling air passage 124 between the valves is wide.

Other parts not specifically referenced in the foregoing relate to conventional four-cycle engines. As illustrated in FIG. 1, a spark plug 66 is installed in a spark plug hole formed in the cylinder head 8. A coil 67 is an ignition coil. A recoil starter 68 having a re-winding rope 69 is provided at a side of crankshaft 4. At the lower corner of the lower case 3, a cooling air entrance 70 is provided which inhales cooling air for the engine generated by rotation of blade 71 on the flywheel 21.

A fuel tank 72 is provided below the oil reservoir 18, adequately spaced apart therefrom. As illustrated in FIG. 2, in the fuel tank 72, a fuel filter 73 and a fuel pipe 74 are provided to bring fuel into the carburetor 100 therethrough.

In order to achieve high power output and relatively low exhaust emissions, the four-cycle engine in accordance with the present invention is provided with a very compact combustion chamber 9. When the engine is started by pulling the winding rope 69 illustrated in FIG. 1, lubricating oil immediately flows into the oil pump 45 by rotation of the rotors 46, 47 through the flexible tube 49. Lubricating oil is delivered into the cylinder bore through the holes 51 and 52 and into the cam chamber through the hole 125 in parallel. By means of the weight 50 supported by and connected to the flexible tube 49, oil flows at any position of the engine.

As illustrated in FIGS. 1 and 2, the circular arc wall 55 surrounds the counterweight webs 24, 26 at a slight distance from the web. The crankshaft webs 24 and 26 churn the oil to mist lubricate the internal engine parts.

After lubricating the engine parts, as the webs 24, 26 rotate, by the reciprocating motion of the piston 6, pressure in the crankshaft chamber 5 changes up and down. Gas including blow-by gas and oil mist in the crankshaft chamber 5 is pushed out to the oil reservoir 18 when the pressure in the crankshaft chamber 5 is higher than in the oil reservoir 18. Since oil reservoir 18 and cam chamber communicate each other by the pipe 54, the blow by gas flows into the cam chamber 53 through pipe 54. The blow by gas including oil mist in the cam chamber 53, in which the valve actuating parts are installed, lubricates the valve train and then flows into the air cleaner box through the passages 61, 63 and check valve 60 as shown in FIG. 2. Then, the blow by gas is inhaled to the combustion chamber 9.

When the piston 6 moves to upward, the check valve 130 closes and pressure in the cylinder bore becomes to be negative.

The excess oil in the cam chamber 53 returns into the oil reservoir 18 through the pipe 54.

Figure 4:
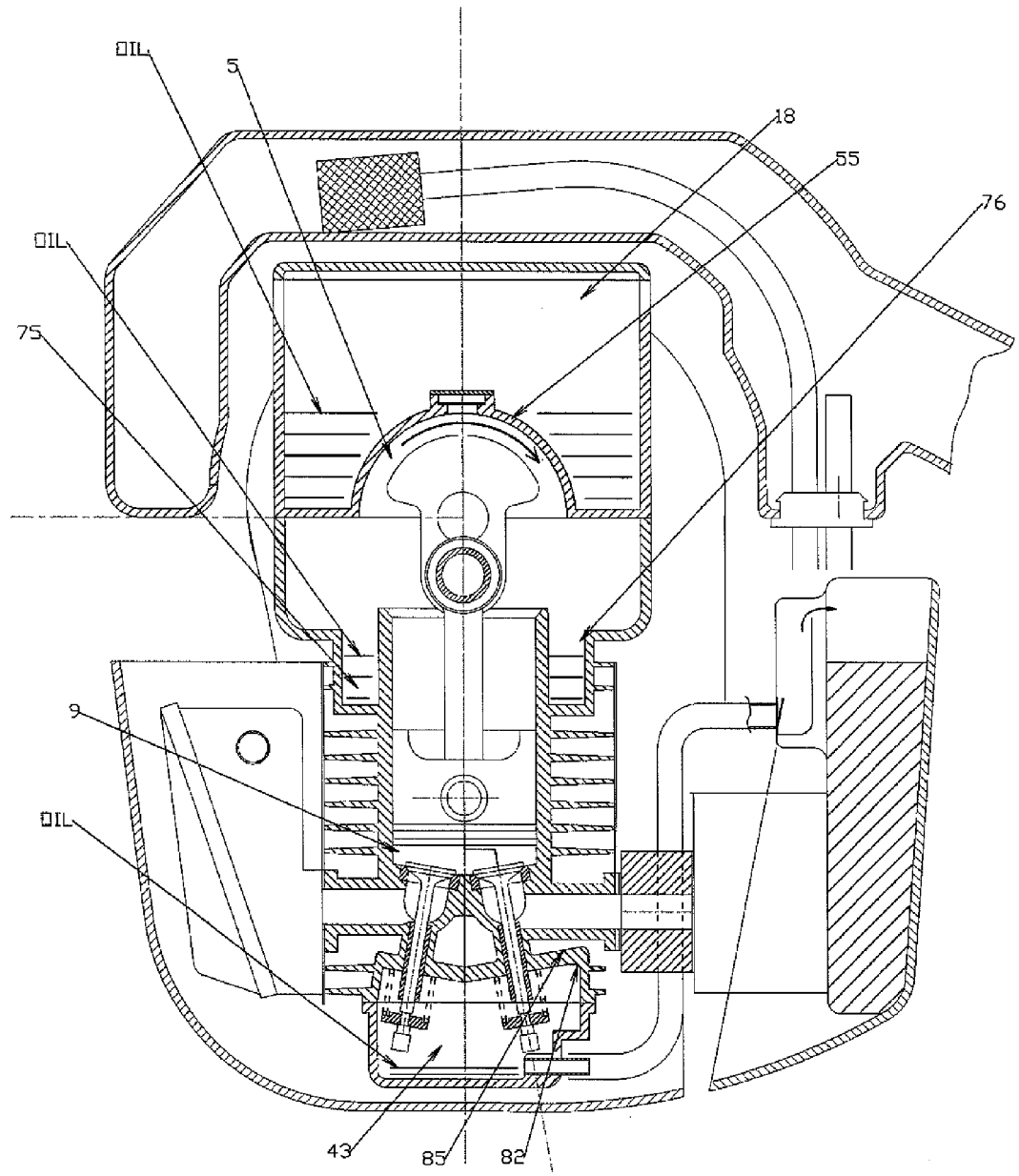
FIG. 4 is a cross-sectional side elevation view of the engine of FIG. 2 when it is oriented to be upside down.
Figure 5:
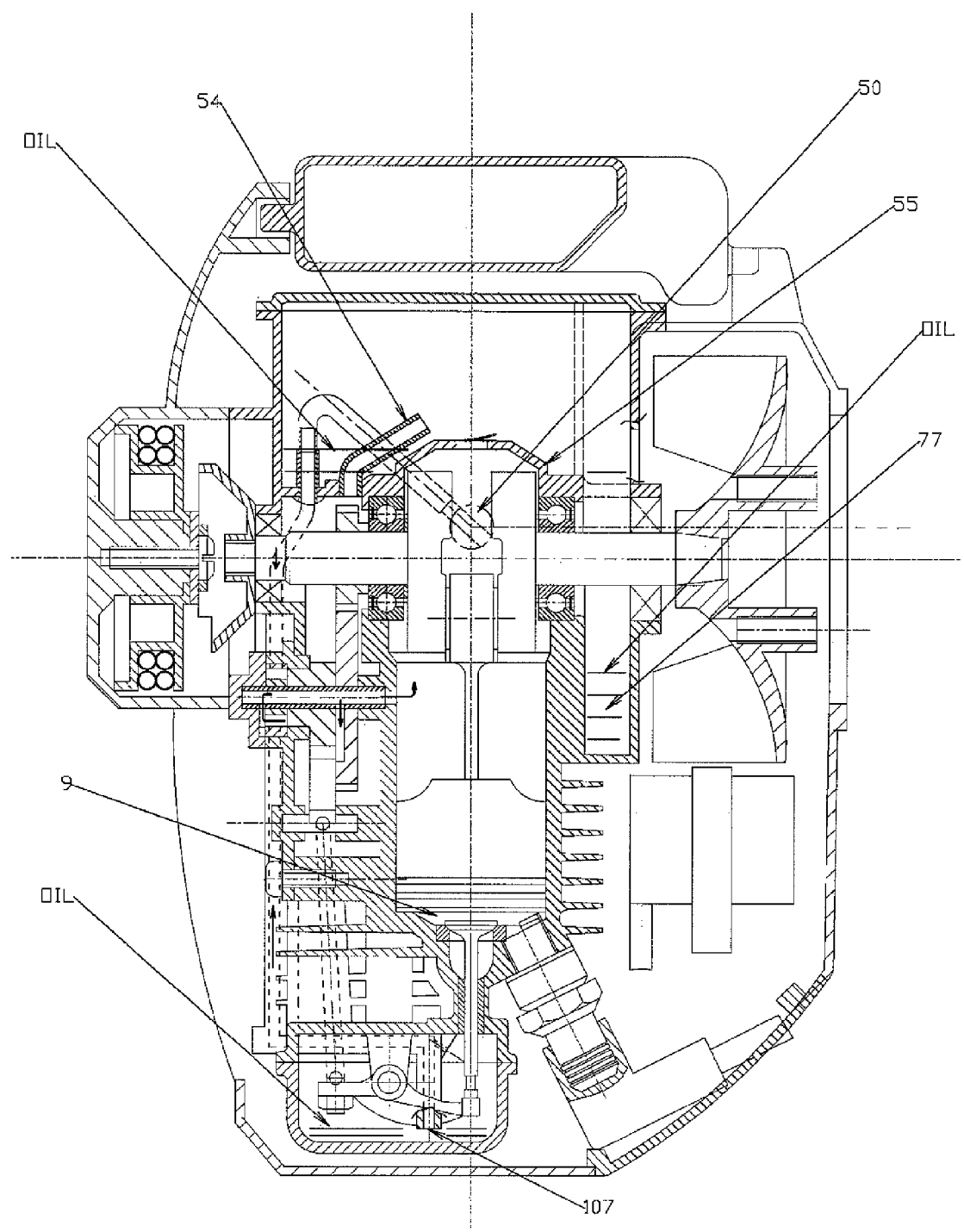
FIG. 5 is a cross-sectional side elevation view of the engine of FIG. 1 when it is oriented to be upside down.

As illustrated in FIGS. 4 and 5, even when the engine is positioned upside down, lubrication oil in the oil reservoir 18 is kept therein with the aid of the circular arc wall 55, and oil is prevented from flowing into the cylinder head part. Further, oil in the crankshaft chamber 5 is kept in the oil recesses 75, 76 (FIG. 4) and 77 (FIG. 5) and oil is prevented from flowing into the combustion chamber 9.

As illustrated in FIG. 5, the pipe 54 prevents oil from flowing into the cam chamber 53 when the engine is oriented upside down.

As illustrated in FIG. 1, when the engine is in a normal orientation, the excess lubricating oil in the valve chamber 43 flows from the valve chamber 43 through the small hole 109 into the oil pump 45 through the passage 104. Further, as illustrated in FIG. 5, when the engine is positioned upside down, the oil, after lubricating various parts in the valve chamber 43, is suctioned by pump 45 from the oil inlet 107 and sent to the oil pump 45 through the passage 104. Accordingly, excess oil does not remain in the valve chamber 43.

It is necessary that portable or transportable power tools are safely stored. For instance, even if a brush cutter is stored with a posture with the vertical boom side up and the engine side down, lubrication oil should not flow into the combustion chamber 9. On the contrary, even if the same brush cutter is stored with a posture with the vertical boom side down and the engine side up, the lubrication oil should not flow into the combustion chamber 9 also.

Figure 9:
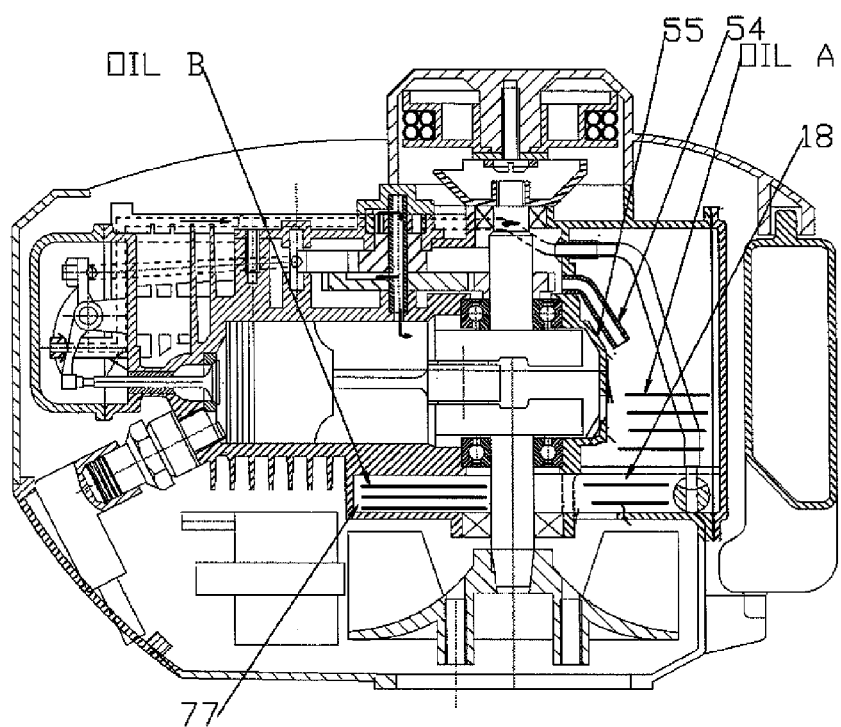
FIG. 9 is a cross-sectional side elevation view of the engine of FIG. 1 when it is oriented with the power take off end down.

FIG. 9 illustrates storage of the engine when the output side of the engine is downward orientated. Oil A is kept in the oil reservoir 18 and does not flow into the crankshaft chamber 5. Oil B is kept in the recess 77 in the cylinder block 1 and does not flow into the crankshaft chamber 5.

Figure 10:
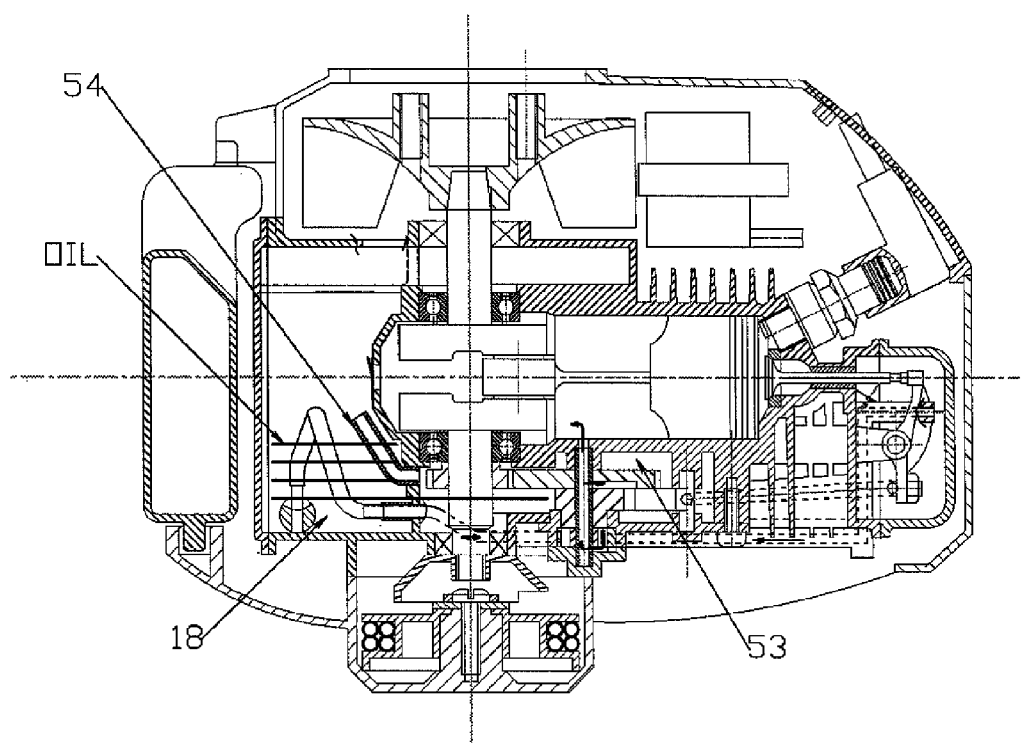
FIG. 10 is a cross-sectional side elevation view of the engine of FIG. 1 when it is oriented with the power take off end up.

FIG. 10 illustrates storage of the engine when the output side of engine is upward oriented. Oil is kept in the oil reservoir 18 and does not flow into the crankshaft chamber 5 or the cam chamber 53.

The function of, the relief passage 204 of the pump 45 is as follows: Assuming that the sectional area of oil passage of the hole to splash oil into cylinder bore is $S_1$, the sectional area of relief passage is $s_2$, and the discharge volume by pump is Q. Then, the discharge volume in to the cylinder bore is $Q*S_1/(S_1+S_2)$. Return volume of oil to the oil reservoir is $Q*S_2/(S_1+S_2)$. So, by adequate design, in accordance with the present invention, some part of the oil discharged by the pump 45 always returns into the oil reservoir 18. In the prior arts, on the other hand, because there is provided no relief passage, in some operation conditions, all of the oil in the oil reservoir 18 is suctioned and sent into the cylinder bore, and no oil returns into the oil reservoir 18. This means that there may be a rare instance where the crankshaft chamber 5 is filled by a lot of oil. The present invention solves this problem.

It is believed that small light weight four cycle engines made in accordance with the present invention will be particularly suitable for use with hand-held or transportable power tools having low emissions and will be sufficiently light to be carried and/or transported by an operator. In the prior art (U.S. Pat. No. 7,287,508 and U.S. Pat. No. 7,624,714), effective lubricating methods for hand-held or transportable power tools have been presented. However, they require a complicated arc and scroll shaped wall to control flow of lubricating oil in the engines and to prevent oil from flowing into a cylinder head when the engine is positioned upside down or vertical.

In the present invention, however, a more simple and economic construction is provided to solve the problem in the prior arts.

Moreover, in the present invention, since no fresh air from the outside is used to circulate lubricant or breathing gas, pressure in the crankshaft chamber 5 is kept to be lower during running of the engine and pumping loss by intake of the fresh air is not produced.

Figure 12:
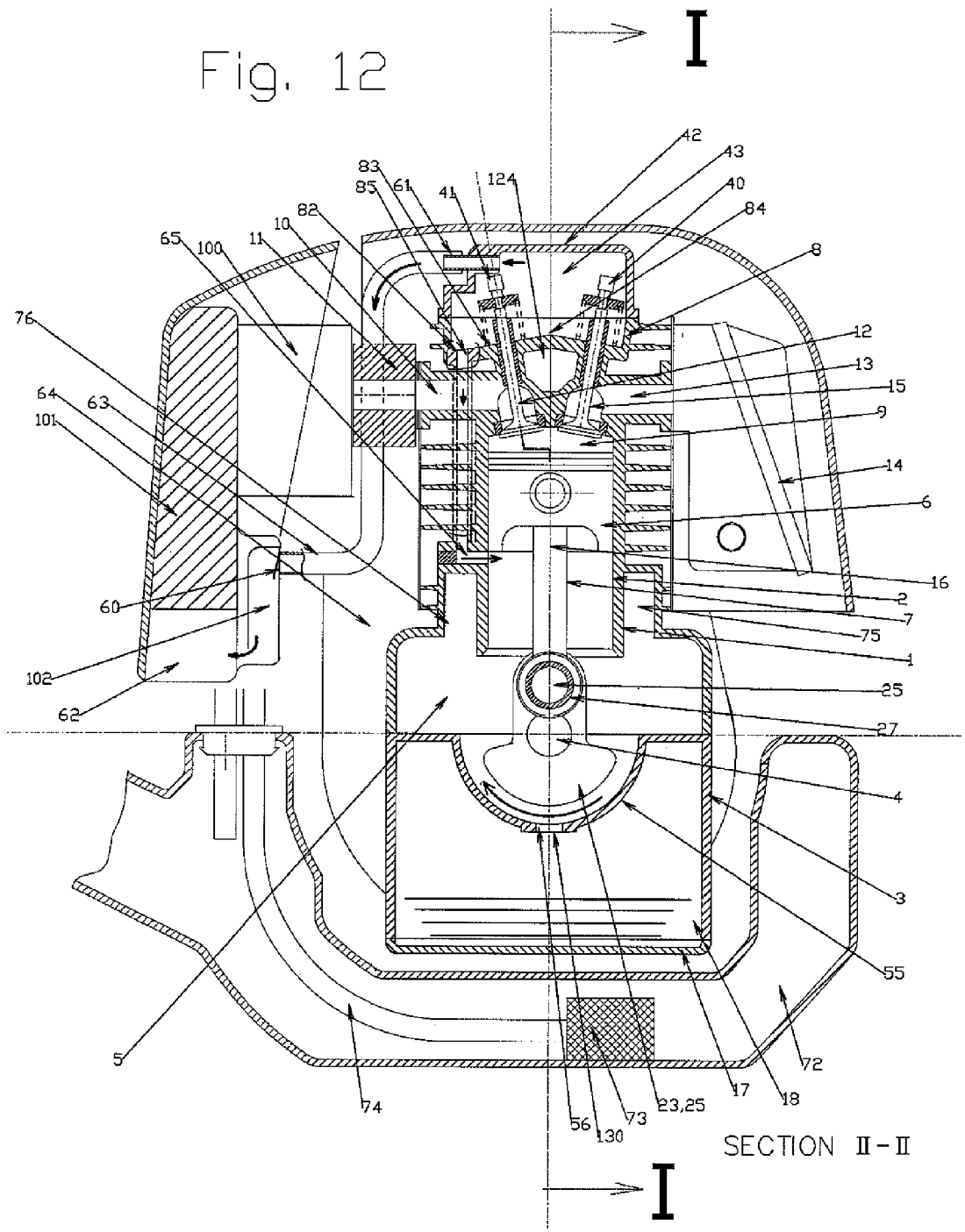
FIG. 12 is another embodiment of the present invention.

FIG. 12 illustrates another embodiment of the present invention. Since the axes of intake valve 12 and exhaust valve 15 are inclined to each other, a corner 82 of a deck 84 of the cylinder head 8 near the inlet valve spring 83 in the valve chamber 43 is lower than the top of the deck 84. So, in the normal operation posture of the engine in which the cylinder head 8 is upright, lubricating oil in the valve chamber 43 flows easily to the corner 82 of the deck 84 after lubricating the parts in the valve chamber. A passage 85 is provided between the corner 82 of the deck 84 and a port 65 formed in the wall of cylinder bore near the skirt of the piston 6 when the piston is at the top dead center. The port 65 opens when the pressure in the crankshaft chamber 5 is negative and the excess oil in the valve chamber 43 returns into the cylinder bore.

Returned oil from the valve chamber may bring some amount of gas. However, the gas inhaled into the crankshaft chamber is a part of the total gas in the engine and does not include fresh gas from the outside, so that the pressure in the crankshaft chamber is kept to be normal and pumping loss does not occur.

Figure 13:
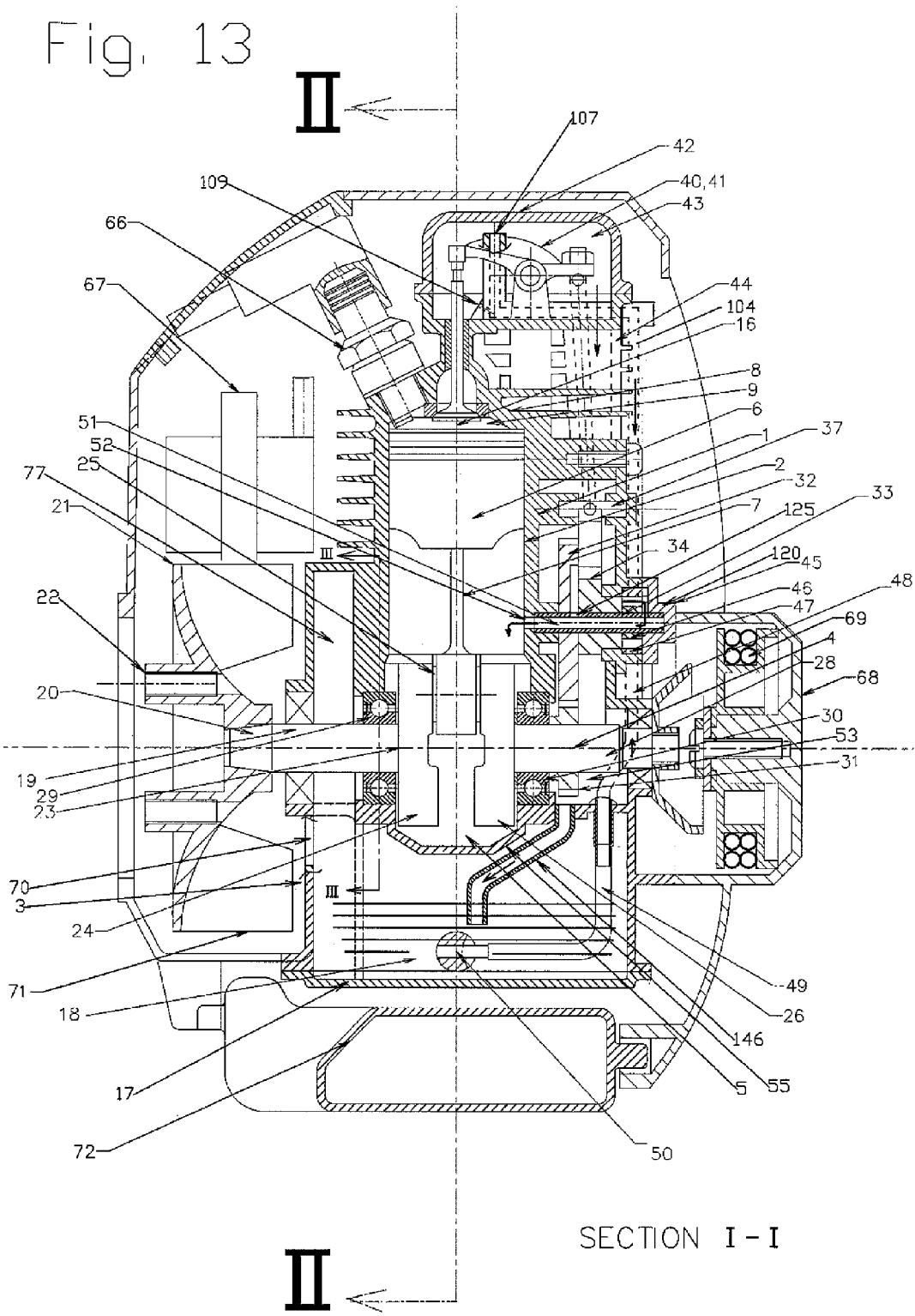
FIG. 13 is a cross-sectional side elevation view of another embodiment of the present invention taken along the rotating axis of the crankshaft and axis of cylinder bore taken along line I-I in FIG. 14.
Figure 14:
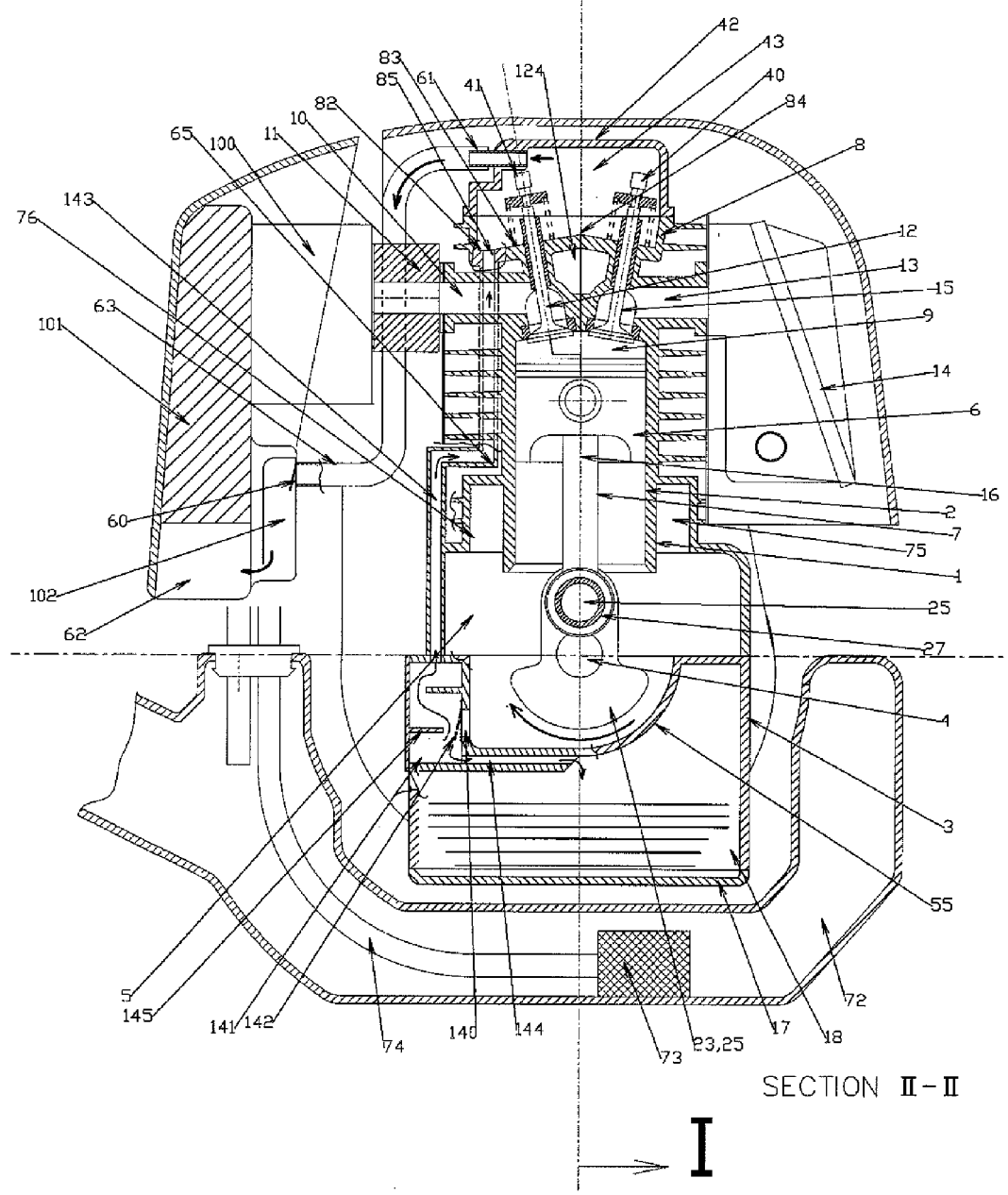
FIG. 14 is a cross-sectional side elevation view of another embodiment of the present invention taken along line II-II in FIG. 13.

FIGS. 13 and 14 are another embodiment of the present invention. At the bottom side of the circular wall 55, a hole 140 and a oil separating chamber 141 is provided; and at the side of the hole 140, an one way check valve 142 is provided between the crankshaft chamber 5 and the oil separating chamber 141 as illustrated in FIG. 14. The check valve 142 is provided so as to open when the pressure in the crankshaft chamber 5 is higher than the pressure in the oil separating chamber 18 and to close when the pressure in the crankshaft chamber 5 is lower than the pressure in the oil separating chamber 141.

The oil separating chamber 141 has a communicating means 143 to the valve chamber 43 and a communication means 144 to the oil reservoir 18; at least one oil separating rib 145 is provided in the oil separating chamber 141.

When the pressure in the crank shaft chamber 5 is positive, oil mist in the crank shaft chamber 5 is pushed out into the oil separating chamber 141 and oil is separated by the rib 145 and returns into the oil reservoir 18 through the passage 143; blow by gas separated from the oil mist is sent to the valve chamber 43 through the passage 144 and lubricates parts in the valve chamber; after lubricating parts in the valve chamber 43, the blow by gas is inhaled into the air cleaner box 62 through passage 61 and 63 and sent to the combustion chamber 9 through the filter element 101; excess oil in the valve chamber 43 flows into the cam chamber 53 through the passage surrounded by the wall 44 and returns into the oil reservoir 18 through the passage 146; thus, a oil mist circulating system is provided from the crank shaft chamber 5 to the oil reservoir 18 or from the crankshaft chamber 5 to the valve chamber 43 or from the valve chamber to the cam chamber 53 or from the cam chamber to the oil reservoir 18; no fresh air is necessary for the lubrication system.

Figure 15:
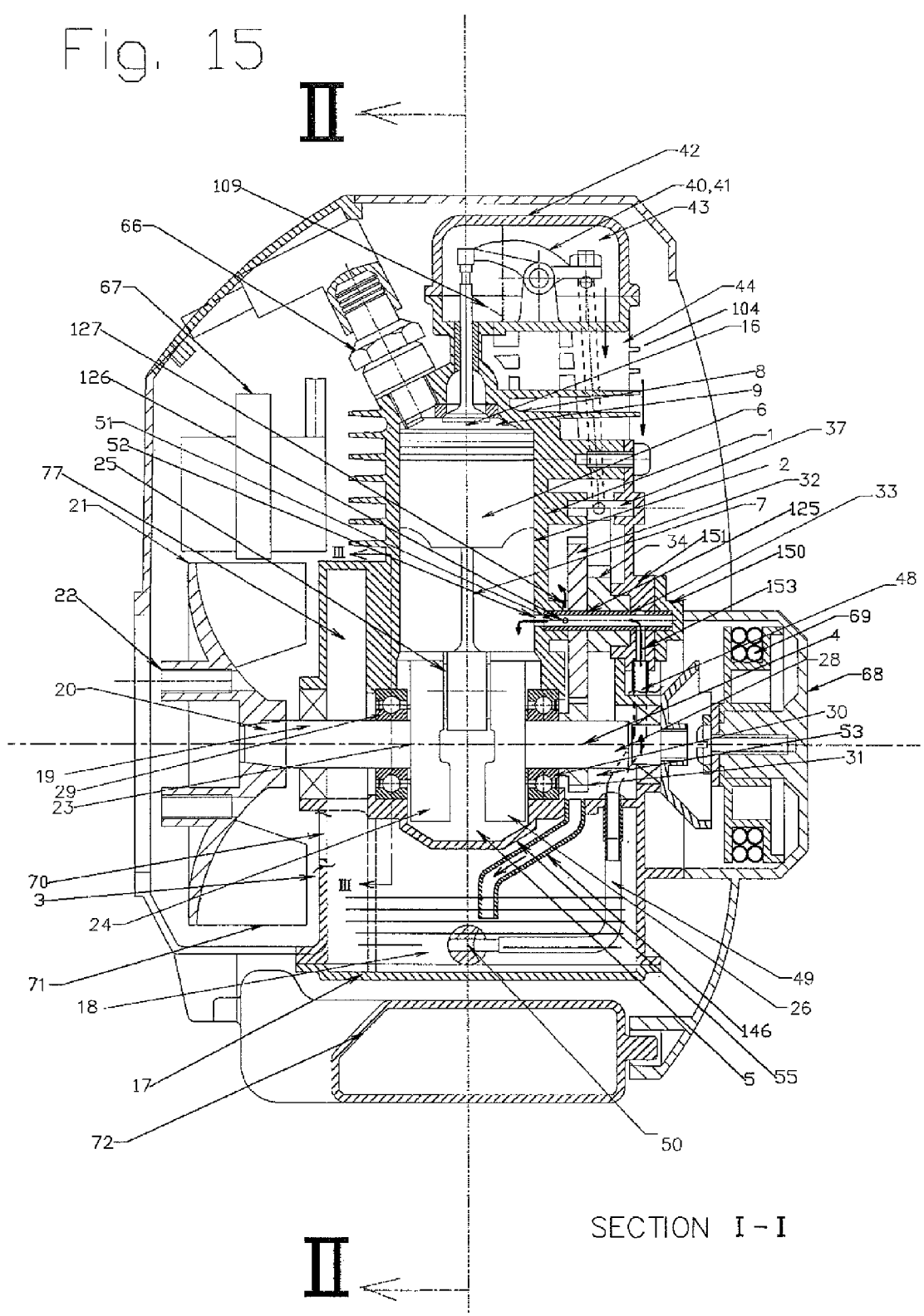
FIG. 15 is a cross-sectional side elevation view of another embodiment of the present invention taken along the rotating axis of the crankshaft and axis of cylinder bore taken along line I-I in FIG. 16.
Figure 16:
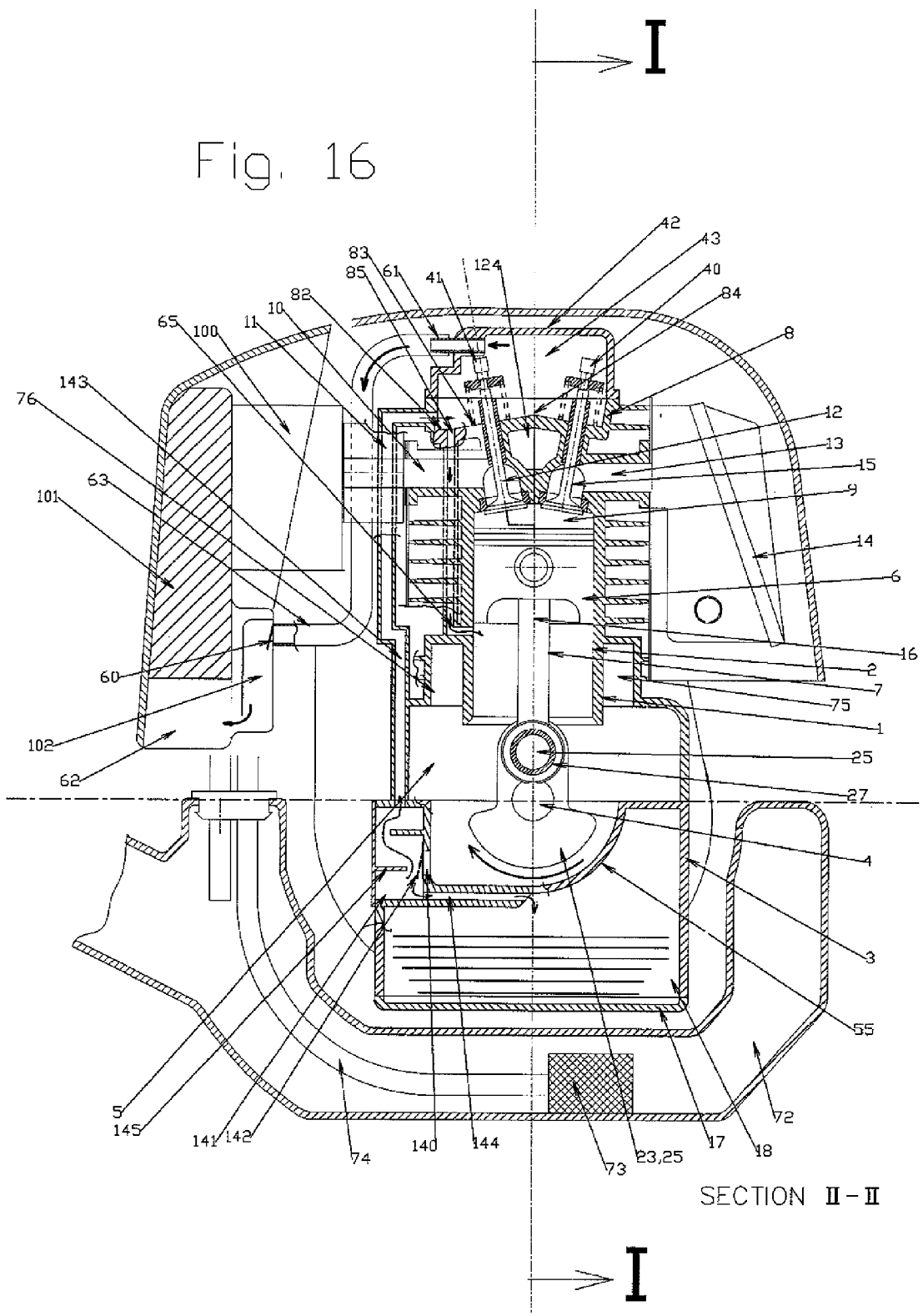
FIG. 16 is a cross-sectional side elevation view of another embodiment of the present invention taken along line II-II in FIG. 15.
Figure 17:
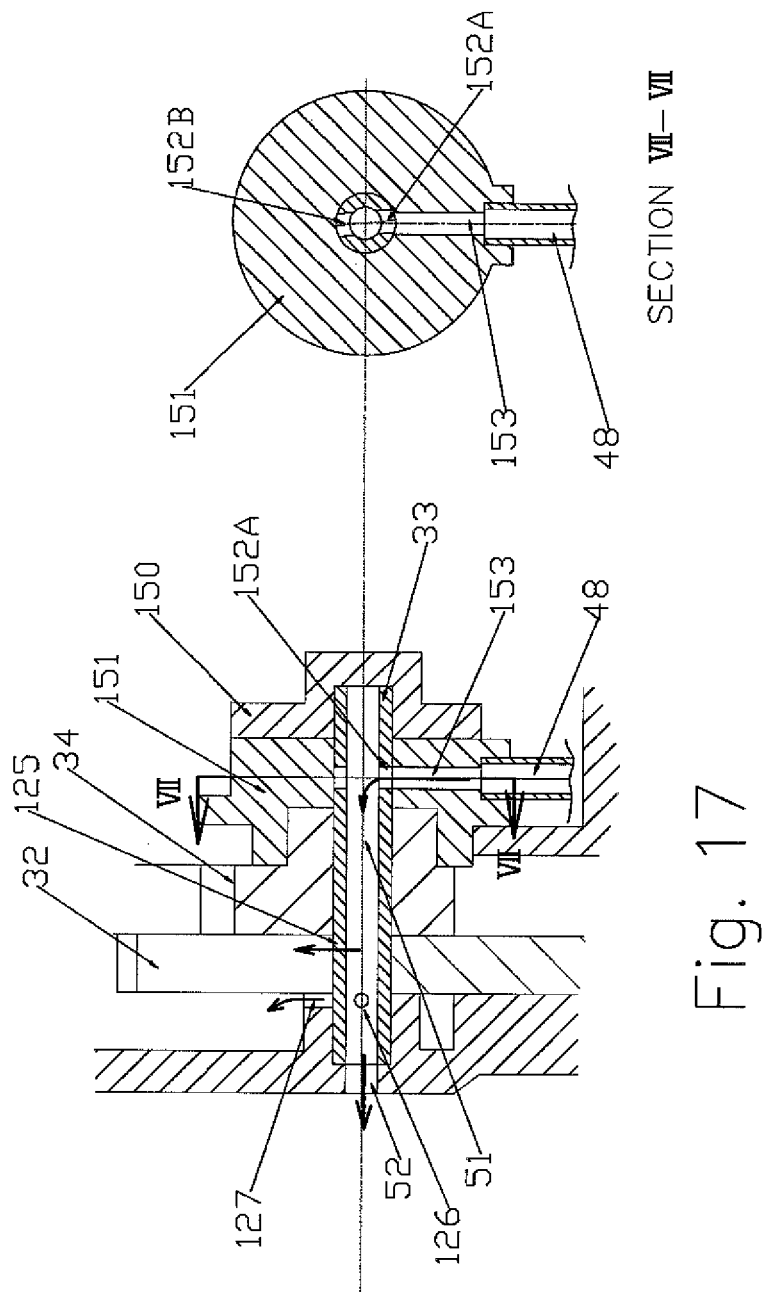
FIG. 17 is an enlarged view of the cam shaft shown in FIG. 15.

FIGS. 15, 16 and 17 illustrate another embodiment of the present invention without using oil pump. At the bottom side of the circular wall 55, a hole 140 and an oil separating chamber 141 is provided; and at the side of the hole 140, an one way check valve 142 is provided between the crankshaft chamber 5 and the oil separating chamber 141 as illustrated in FIG. 16. The check valve 142 is provided so as to open when the pressure in the crankshaft chamber 5 is higher than the pressure in the oil separating chamber 141 and to close when the pressure in the crankshaft chamber 5 is lower than the pressure in the oil separating chamber 141.

The oil separating chamber 141 has a communicating means 143 to the valve chamber 43 and a communication means 144 to the oil reservoir 18; at least one oil separating rib 145 is provided in the oil separating chamber 141.

As illustrated in FIG. 17, a cam gear 32 and a cam 34 is affixed with the cam shaft 33, wherein the cam shaft 33 is supported by the cylinder block 2 and a cam shaft cover 150. The cam shaft cover 150 is attached to a cam chamber cover 151 which is attached to the cylinder block 2.

When the pressure in the crank shaft chamber is negative due to the reciprocating motion of the piston 6, lubrication oil flows into the cam shaft 33 through a passage 48 as illustrated in the previous embodiment of the present invention. A passage 153 provided in the cam chamber cover 151 communicates with the passage 48 at an end and communicates with the cam shaft 33 at the other end. A hole 152A and/or a hole 152B are provided in the cam shaft 33 and communicate with the passage 153 when the cam shaft rotates and the passage 153 mates to the hole 152A and/or 152B.

The holes 152A and 152B communicate with the inner through hole 51 of the cam shaft 33. The hole 152A and 152B are positioned freely by a designer's intention. Since the passage 153 and the holes 152A and/or 152B is formed a rotary valve, oil flow from the passage 43 flows into the crank shaft chamber 5 through the inner through hole 51 and the hole 52 at previously designed timing. Since the cam shaft rotates with half speed of the crank shaft, when only a hole 152A is provided, lubricating oil is inhaled to the crankshaft chamber at every two revolution of the crankshaft, while when holes 152A and 152B are provided, lubricating oil flows at every revolution of the crankshaft. Thus, the quantity of oil circulated in the engine is controlled by the designer's intention. As for other parts, such as shown in FIGS. 13 and 14 are basically followed except for the fact that the pump 45 is not used.

To control quantity of lubricating oil in the cam chamber, a through hole 126 in the cam shaft 33 and a slit 127 in the cylinder block 2 are provided as illustrated in FIGS. 15 and 17. The holes 126 and the slit 127 are positioned so as to mate with each other when the pressure in the crankshaft chamber 5 is higher than the pressure in the cam chamber 53 and not to mate when the pressure in the crankshaft chamber 5 is lower than the pressure in the cam chamber 53. Thus, the hole 126 and slit 127 form a rotary valve. Lubricating oil is pushed out into the cam chamber at every revolution of the crankshaft when the hole 126 and the slit mate.

Further, construction such as the pump in the prior art— U.S. Pat. No. 7,287,508 and U.S. Pat. No. 7,624,714—is basically followed, so that specific feature and advantage of the prior art are maintained in the present invention.

What is claimed is:

1. A single-cylinder, four-stroke cycle, spark ignition internal combustion engine for mounting on a power tool comprising:
a cylinder block having a cylinder, a cylinder head, a piston mounted for reciprocation in said cylinder, said cylinder head defining an air-fuel combustion chamber;
a lower case mating with said cylinder block by a plane perpendicular to the cylinder bore axis;
a crankshaft chamber formed by said cylinder block and said lower case;
an air-fuel mixture intake port and an exhaust gas port in said cylinder head;
a valve cover on said cylinder head defining a valve chamber;
an intake valve and an exhaust valve mounted in said intake and exhaust port, respectively, for reciprocation between port-open and port-closed positions;
a valve-actuating valve train in a valve chamber, said valve train including at least one rocker arm and at least one valve train push rod assembly extending therefrom within said valve chamber and engaging said rocker arm;
a lubrication oil reservoir formed below the lower case;
said oil reservoir is partitioned from the crankshaft chamber so as to avoid oil leakage in any slanted state;
a crankshaft rotatably mounted by ball bearings in said crankshaft chamber, wherein said crankshaft includes a crank portion and at least one counterweight web and has an axis which is on the mating plane of said cylinder block and said lower case;
a connecting rod having articulated connections at one end thereof to said piston and at an opposite end thereof to said crank portion, thereby forming a piston-connecting rod crankshaft assembly; and
a cam chamber having at least one cam being drivably connected to said crankshaft, said at least one cam having a cam gear and being driven at one-half crankshaft speed, the opposite end of said push rod assembly being drivably connected to said cam whereby said push rod assembly is actuated with a reciprocating motion upon rotation of said at least one cam, said cam chamber having communication means to the oil reservoir and the valve chamber; a cam chamber cover connected to support said cam gear-cam assembly, wherein lubrication oil is inhaled through said cam chamber cover from said oil reservoir when the pressure in the crankshaft chamber is negative and a rotary valve provided between said cam shaft and said cam chamber cover opens and splashes the oil into the cylinder to lubricate the engine parts inside the cylinder, wherein said lower case has a circular arc wall to separate said oil reservoir from said crankshaft chamber, said circular arc wall at least partially surrounding said web at a slight distance therefrom, and said circular arc wall having at least one drain hole and a valve to communicate between said crankshaft chamber and an oil separating chamber; said oil separating chamber having communicating means between oil separating chamber and valve chamber or between said oil separating chamber and oil reservoir, wherein the opening of the valve is controlled by reciprocating motion of said piston, and wherein said valve opens when pressure in the crankshaft chamber is positive and closes when the pressure in the crankshaft chamber is negative, thereby the valve establishing a lubrication oil mist flow circuit from said crankshaft chamber to said oil separating chamber or from said oil separating chamber to said valve chamber or from said valve chamber to said cam chamber or from said cam chamber to said oil reservoir.

2. The engine set forth in claim 1, further comprising:
a passage connected from said valve chamber to the crankshaft chamber, and a valve being provided at the entrance of said passage into the crankshaft chamber, wherein the opening of the valve is controlled by reciprocating motion of said piston, and wherein said valve opens when pressure in the crankshaft chamber is negative and closes when the pressure in the crankshaft chamber is positive, thereby the oil mist flow control valve structure establishing a lubrication oil flow circuit from said valve chamber to said crankshaft chamber.

3. The engine set forth in claim 1, wherein said cylinder block has at least one oil recess to store oil when the engine is oriented to incline and to prevent oil in the crankshaft chamber from flowing into combustion chamber.

4. The engine set forth in claim 1, wherein said lower case has at least one oil recess to store oil when the engine is oriented to incline and to prevent oil in the oil reservoir from flowing into said crankshaft chamber.

5. The engine set forth in claim 1, wherein said lower case has at least one pipe or one passage to prevent oil in the oil reservoir from flowing into said cam chamber.

6. The engine set forth in claim 1, wherein said cam shaft splashes lubrication oil from said crankshaft chamber to said cam chamber when pressure in said crankshaft chamber is positive and a rotary valve provided between said cam shaft and said cylinder block opens.

\* \* \* \* \*